US012651514B2

(12) United States Patent
Ha et al.

(10) Patent No.: US 12,651,514 B2
(45) Date of Patent: Jun. 9, 2026

(54) METHOD FOR DIAGNOSING FAILURE OF AND PROVIDING MAINTENANCE INFORMATION ABOUT ATM

(71) Applicant: Hyosung TNS Inc., Seoul (KR)

(72) Inventors: Kyung Il Ha, Suwon-si (KR); Keum Bo Na, Seoul (KR); Il Je Hyung, Seoul (KR)

(73) Assignee: Hyosung TNS Inc., Seoul (KR)

( * ) Notice: Subject to any disclaimer, the term of this patent is extended or adjusted under 35 U.S.C. 154(b) by 0 days.

(21) Appl. No.: 19/086,776

(22) Filed: Mar. 21, 2025

(65) Prior Publication Data

US 2025/0218256 A1      Jul. 3, 2025

Related U.S. Application Data

(63) Continuation of application No. PCT/KR2024/009026, filed on Jun. 27, 2024.

(30) Foreign Application Priority Data

Jul. 6, 2023    (KR) ........................ 10-2023-0087698

(51) Int. Cl.
  G07F 19/00      (2006.01)
  G06Q 10/20      (2023.01)
(52) U.S. Cl.
  CPC ........... G07F 19/209 (2013.01); G06Q 10/20 (2013.01); G07F 19/211 (2013.01)
(58) Field of Classification Search
  CPC ...... G07F 19/20; G07F 19/201; G07F 19/202; G07F 19/203; G07F 19/206; G07F 19/209; G07F 19/211; G06Q 10/20
  See application file for complete search history.

(56) References Cited

U.S. PATENT DOCUMENTS 11,037,391 B1 *  6/2021  Alexander ............ G07F 19/202
2013/0041809 A1 *  2/2013  Ino ........................... G07C 9/38
                                                                      109/23

FOREIGN PATENT DOCUMENTS

JP        2005-222336 A      8/2005
JP        2011-053887 A      3/2011
JP        2018-147296 A      9/2018
            (Continued)

OTHER PUBLICATIONS

International Search report of PCT/KR2024/009026 mailed on Oct. 8, 2024.

*Primary Examiner* — Laura A Gudorf
(74) *Attorney, Agent, or Firm* — WTA IP Law P.C.

(57)        ABSTRACT

The present invention relates to diagnosing a failure of and providing maintenance information about an ATM. When a failure occurs in the ATM, a node at which an abnormal sensor value is initially measured during a failed transaction is identified on the basis of sensor values measured by various sensors provided in the ATM. A failure cause providing module that provided an abnormal operation cause for the failure is predicted and information about a failure occurrence module in which the failure actually occurred and information about the failure cause providing module are provided to a maintenance worker on site, supporting the maintenance worker so that the maintenance worker can, during a failure recovery process, repair the failure occurrence module along with the failure cause providing module that caused the failure.

11 Claims, 6 Drawing Sheets

(56) References Cited

FOREIGN PATENT DOCUMENTS

| | | | |
|---|---|---|---|
| KR | 10-2006-0128366 | A | 12/2006 |
| KR | 10-1093841 | B | 12/2011 |
| KR | 10-2021-0063397 | A | 6/2021 |

\* cited by examiner

Figure 3A:
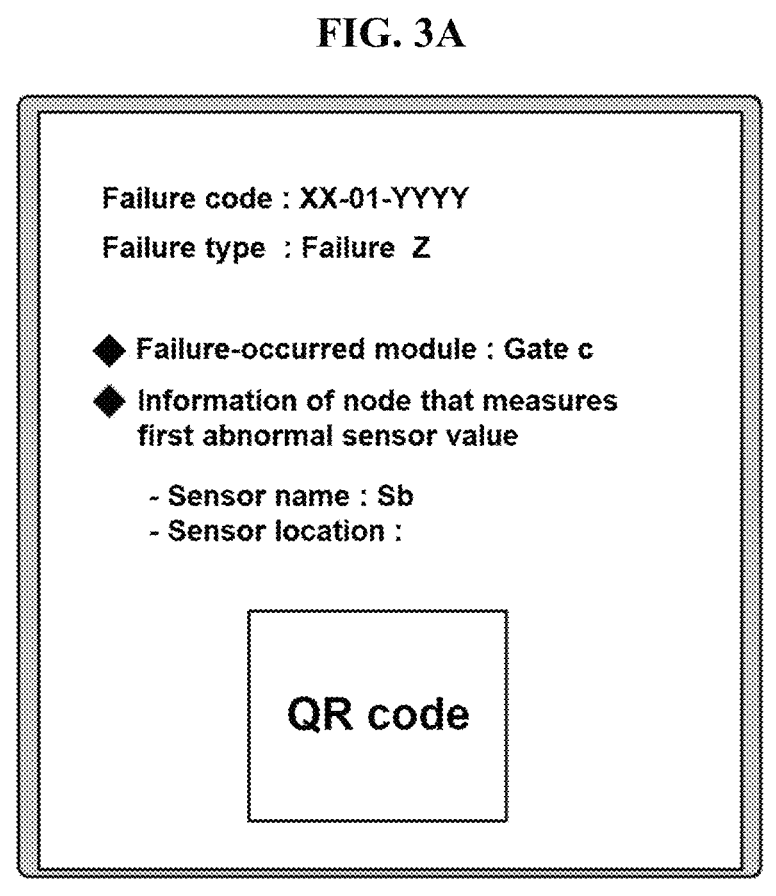

Failure code : XX-01-YYYY

Failure type  : Failure  Z

◆ Failure-occurred module : Gate c

◆ Information of node that measures
first abnormal sensor value

- Sensor name : Sb
  - Sensor location :

QR code

FIG. 3B

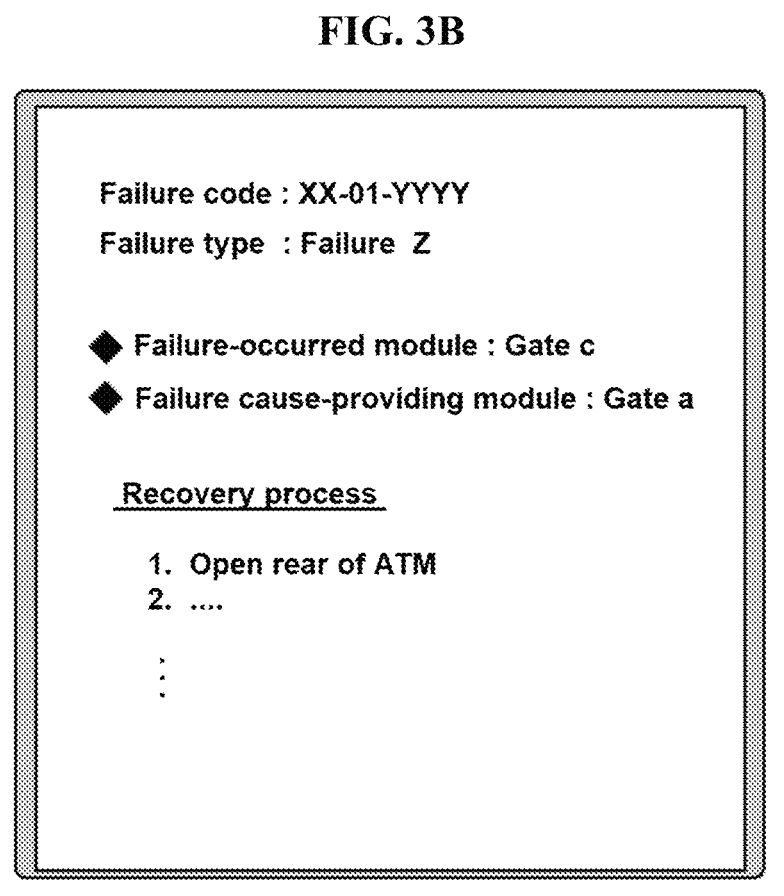

Failure code : XX-01-YYYY

Failure type : Failure Z

◆ Failure-occurred module : Gate c

◆ Failure cause-providing module : Gate a

Recovery process

1. Open rear of ATM
2. ....

FIG. 4

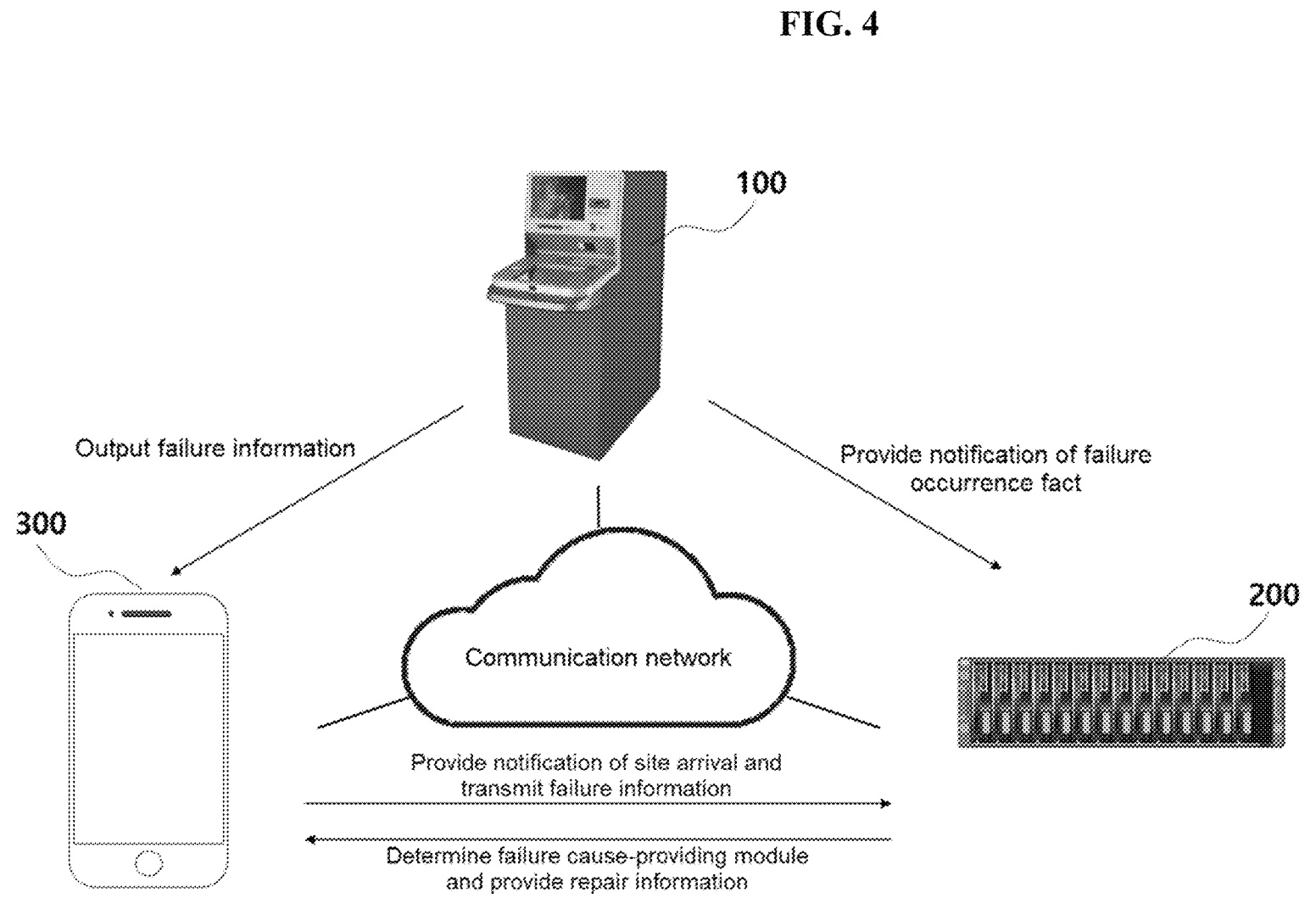

Provide notification of failure occurrence fact

Output failure information

Communication network

Provide notification of site arrival and transmit failure information

Determine failure cause-providing module and provide repair information

100

200

300

METHOD FOR DIAGNOSING FAILURE OF AND PROVIDING MAINTENANCE INFORMATION ABOUT ATM

CROSS-REFERENCE TO RELATED APPLICATIONS

This is a bypass continuation of International PCT Application No. PCT/KR2024/009026, filed on Jun. 27, 2024, which claims priority to Republic of Korea Patent Application No. 10-2023-0087698 filed on Jul. 6, 2023, which are incorporated by reference herein in their entirety.

TECHNICAL FIELD

The present disclosure relates to a method of diagnosing a failure and providing repair information in a banking ATM, and more particularly, to a method of diagnosing a failure and providing repair information in a banking ATM, which can effectively prevent the recurrence of a failure having a similar type and improve management efficiency of the banking ATM by supporting a maintenance worker to be capable of repairing a failure cause-providing module that has caused the cause of a failure along with the repair of a failure-occurred module in a failure recovery process because a node at which an abnormal sensor value was first measured is checked, a failure cause-providing module that has provided the cause of an abnormal operation that has caused a failure is predicted based on the check, and information on a failure-occurred module in which the failure actually occurred and information on the failure cause-providing module are provided to a maintenance worker in the site in a process of performing transactions in which the failure occurred based on sensor values measured by various sensors included in the banking ATM when the failure occurs in the banking ATM.

BACKGROUND ART

A banking automatic teller machine (ATM) has been introduced to support untact financial transactions for customers of a financial institution, and performs various tasks, such as the deposit and withdrawal of cash and checks, the update of a bank account, remittance, and the payment of utility bills.

To this end, the banking ATM includes various modules, such as a display, a scanner, a printer, and a camera, and is construct to have various software programs mounted on a CPU for controlling the display, scanner, printer, and camera in order to smoothly drive each module.

Meanwhile, in a financial transaction process through the banking ATM, a medium is returned along a return route within the apparatus. If a return failure, such as a case in which banknotes are returned in the state in which the banknotes have been tilted to one side (hereinafter referred to as a "skew") or the banknotes are returned at an excessively narrow interval between the media for various reasons, occurs, in the return and loading process of a medium which is performed at a very high speed, a jam occurring because the medium in the return failure state is jammed between the modules or a failure, such as or damage to the medium, may frequently occur.

When a failure occurs in the banking ATM, a proper automatic recovery attempt is performed according to a failure occurrence situation as in Korean Patent No. 10-1093841, etc. If the failure is not solved by such a self-recovery attempt within the apparatus, the apparatus stops corresponding financial transactions, outputs failure information through a display unit of the banking ATM, that is, a display screen for customers, a printer, and a display screen for a worker, which is included in the rear of the banking ATM, and supports a maintenance worker who visits an financial institution in which the apparatus is operated for the repair and maintenance of the apparatus to perform the repair of the apparatus based on the failure information received from the banking ATM or a maintenance and repair server of an apparatus management organization by notifying the financial institution and the maintenance and repair server of the failure occurrence fact and failure information.

However, in general, when a failure of the banking ATM occurs, failure information that is provided to support the repair and maintenance of the apparatus by a maintenance worker includes only information on a module in which a failure occurred. Accordingly, the maintenance worker simply repairs only the module in which the failure occurred and resumes the management of the apparatus. In this case, in a financial transaction process in which the failure occurred, if a module that provides the cause of the occurrence of the failure is present, measures against the module that provides the cause of the failure are never performed by the maintenance worker because failure information provided to the maintenance worker does not include information on the module that provides the cause of the failure.

If the maintenance worker repairs only the module in which the failure occurred without taking measures against the module that provides the cause of the failure as described above, although the management of the banking ATM is resumed normally, a failure having the same and/or similar type may subsequently repeatedly occur again because the basic cause that has caused the corresponding failure is not solved. Accordingly, there is a problem in that the lifespan of the banking ATM is rapidly reduced due to a frequent failure.

If only a module in which a failure occurred is repaired without a fundamental solution to a module that provides the cause of the failure of a banking ATM as described above, there is a difficulty in that repair and maintenance efficiency of the banking ATM is also degraded because a maintenance worker has to repeatedly visit a corresponding apparatus for the repair of the corresponding apparatus due to a failure of the apparatus, which occurs again in the future.

SUMMARY

The present disclosure has been contrived to solve the technical problems, and more specifically, an object of the present disclosure is to provide a method of diagnosing a failure and providing repair information in a banking ATM, which can effectively prevent the recurrence of a failure having a similar type and improve management efficiency of the banking ATM by supporting a maintenance worker to be capable of repairing a failure cause-providing module that has caused the cause of a failure along with the repair of a failure-occurred module in a failure recovery process because a node at which an abnormal sensor value was first measured is checked, a failure cause-providing module that has provided the cause of an abnormal operation that has caused a failure is predicted based on the check, and information on a failure-occurred module in which the failure actually occurred and information on the failure cause-providing module are provided to a maintenance worker in the site in a process of performing transactions in which the failure occurred based on sensor values measured by various sensors included in the banking ATM when the failure occurs in the banking ATM.

As a technological spirit for accomplishing the object, the present disclosure provides a method of providing failure diagnosis results and repair information to a maintenance worker in the site when a failure of a banking ATM occurs, including generating a failure code by identifying a failure-occurred module in which a failure occurred in a banking ATM, checking sensor values measured by multiple detection sensors provided at respective nodes on a return route of the failure-occurred medium in a financial transaction process in which the corresponding failure occurred, reading sensor information of a node at which an abnormal sensor value that falls outside a preset normal range was first sensed, among the checked sensor values, when the abnormal sensor value is detected, generating failure information including the failure code and the sensor information of the node at which the abnormal sensor value was first sensed, and providing the generated failure information to a maintenance worker.

The method of diagnosing a failure and providing repair information in a banking ATM according to the present disclosure supports a maintenance worker to be capable of repairing a failure-occurred module and a failure cause-providing module that has caused the cause of a failure because the method is constructed to predict the failure cause-providing module that has caused the failure and provided the cause of an abnormal operation by checking a node at which an abnormal sensor value was first measured based on sensor values measured by sensors included at respective nodes in a banking ATM in which the failure occurred during financial transactions and to provide a maintenance worker in the site with both information on the failure-occurred module in which the failure actually occurred and information on the failure cause-providing module. Accordingly, there are effects in that the recurrence of a failure having a similar type can be effectively prevented and thus this reduces the frequency of maintenance worker visits and enhances the repair and maintenance efficiency of a banking ATM.

BRIEF DESCRIPTION OF THE DRAWINGS

FIG. 1 is a diagram that exemplifies a display screen for a maintenance worker, which is provided when a failure occurs in a conventional banking ATM.

FIGS. 3A and 3B are diagrams that exemplify failure information and repair information which are provided from the banking ATM and/or a maintenance server to a maintenance worker in a failure recovery process according to an embodiment of the present disclosure.

FIG. 4 is a diagram schematically illustrating a networking environment for a system for diagnosing a failure and providing repair information in the banking ATM according to an embodiment of the present disclosure.

DETAILED DESCRIPTION

Figure 2:
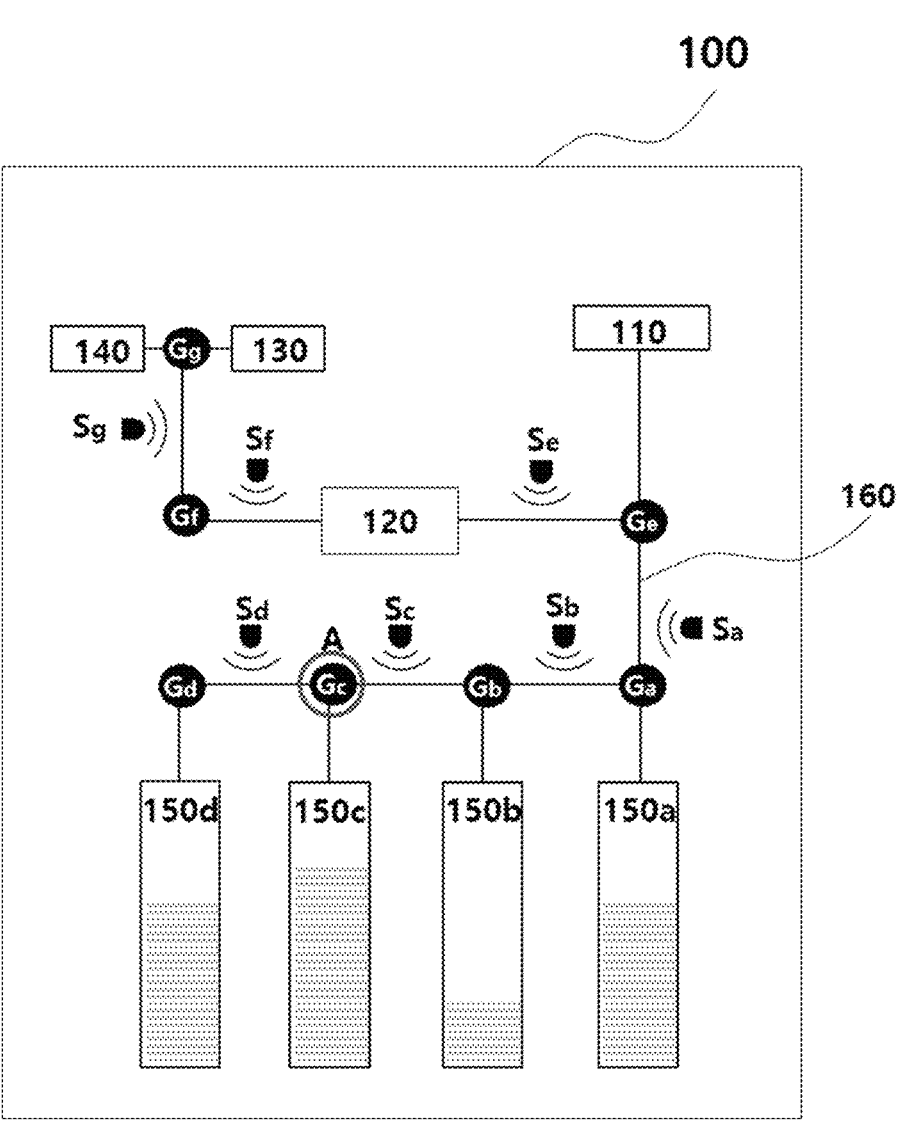
FIG. 2 is a diagram that schematically replicates internal components of the apparatus of a banking ATM to which an embodiment of the present disclosure is applied.

The present disclosure may be modified in various ways and may have various embodiments. Hereinafter, specific embodiments of the present disclosure are described in detail with reference to the drawings, but the present disclosure is not limited to the following embodiments unless the present disclosure deviates from the subject matter thereof.

Figure 1:
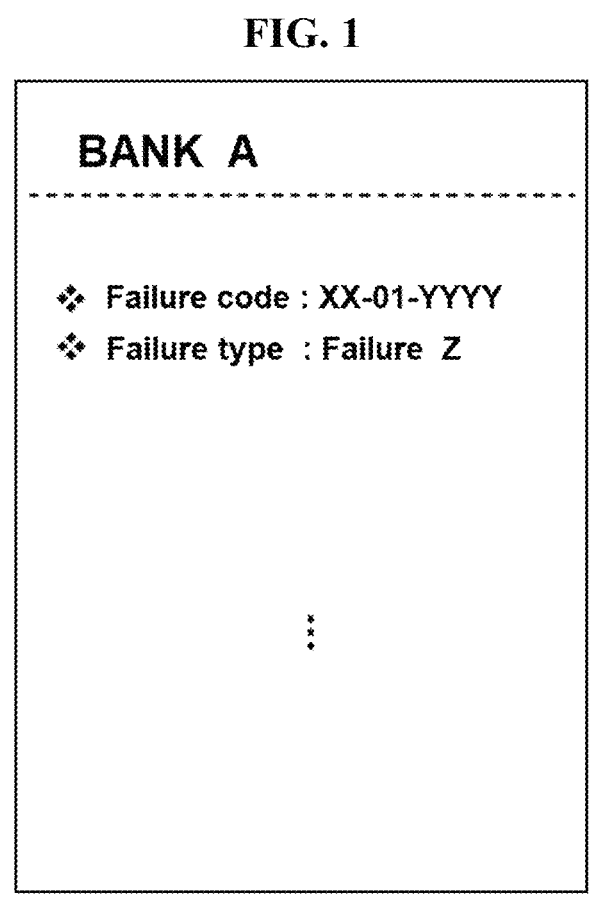

FIG. 1 is a diagram that exemplifies a display screen for a maintenance worker, which is provided when a failure occurs in a conventional banking ATM.

As described above, when a failure occurs in a financial transaction process, a conventional banking ATM outputs failure occurrence information of the apparatus through the display unit of the banking ATM and simultaneously notifies the financial server of an financial institution and the maintenance server of an apparatus management organization of the failure occurrence fact after stopping the corresponding financial transactions.

After notified of the failure occurrence fact, the management organization of the banking ATM supports the maintenance and repair of the apparatus by dispatching a maintenance worker to the place where the corresponding banking ATM has been installed. In this case, as illustrated in FIG. 1, the maintenance worker who has arrived at the site in order to repair the banking ATM may check information on a failure code and a failure type in relation to the failure occurred in the corresponding banking ATM through a display for a maintenance worker, which is included in the banking ATM. In general, a maintenance worker in the site performs a repair on the failure-occurred module of the banking ATM by connecting to a maintenance server through his or her portable terminal based on the information checked as described above and being provided with repair information for repairing the corresponding failure.

That is, the maintenance worker receives a repair process for corresponding failure information from the maintenance server by transmitting the failure information checked in the banking ATM to the maintenance server connected through his or her portable terminal, repairs the failure-occurred module in which the failure occurred according to the received repair process, and resumes the management of the banking ATM normally.

However, if a failure occurs in a banking ATM as described above, the corresponding failure may occur due to a cause, such as a defect of a module in which the failure occurred or an operation error. However, in many cases, a case in which a failure is caused due to an operation error occurred in a previous module in which a failure-occurred medium was handled prior to a corresponding module is also frequently present. In this case, a failure-occurred module and a failure cause-providing module that has caused the occurrence of the failure are not matched because the failure cause-providing module is separately present.

Conventionally, a separate verification procedure for identifying a failure cause-providing module is not performed. Accordingly, a maintenance worker never takes measures against the failure cause-providing module because failure information provided to the maintenance worker does not include information on the failure cause-providing module. If the maintenance worker repairs only a failure-occurred module without taking measures against the failure cause-providing module, although the management of a banking ATM is resumed normally, there is a high likelihood that the underlying cause of the failure has not been addressed. As a result, the same and/or similar types of failures may repeatedly recur in the future.

If only a module in which a failure actually occurred is repaired without a fundamental solution to a failure cause-providing module as described above, a maintenance worker has to repeatedly visit a corresponding apparatus for the repair of the corresponding apparatus due to a failure of the apparatus that occurs again in the future. Accordingly, there is a problem in that repair and maintenance efficiency of the apparatus is reduced.

In order to solve such a problem, the present disclosure has presented a method of diagnosing a failure and providing repair information in a banking ATM by checking the values of various sensors provided in a corresponding route along a medium return flow in financial transactions in which a failure occurred when the failure occurs in a banking ATM, predicting a failure cause-providing module that has caused the failure and provided the cause of an abnormal operation through a process of detecting a node at which the first abnormal sensor value was sensed based on the checked values of the sensors, and providing a maintenance worker in the site with both information on a failure-occurred module in which the failure actually occurred and information on the failure cause-providing module. A detailed construction of the method is described with reference to the following drawings.

FIG. 2 is a diagram that schematically replicates internal components of the apparatus of a banking ATM to which an embodiment of the present disclosure is applied. FIGS. 3A and 3B are diagrams that exemplify failure information and repair information which are provided from the banking ATM and/or a maintenance server to a maintenance worker in a failure recovery process according to an embodiment of the present disclosure.

As illustrated in FIG. 2, a common banking ATM 100 includes a deposit and withdrawal unit 110, a discrimination unit 120, a reject box 130, a temporary payment unit 140, and multiple banknote cassettes 150a to 150d therein. The devices are connected through a return route 160 for the return of a medium. Multiple gates Ga to Gg and multiple sensors Sa to Sg that detect a medium passing through each module along a return route are provided on the return route.

A process of diagnosing a failure and providing repair information by the banking ATM constructed as described above is described as follows.

For example, in a process of a medium kept in the temporary payment unit 140 being deposited and received in the banknote cassettes 150a to 150d after the deposit and count of the medium are completed normally, when corresponding transactions are stopped because the medium is jammed at a specific point A, conventionally, the operation module Gc at the point at which a failure occurred is treated as a failure-occurred module and is included in failure information. The failure information is provided to a maintenance worker.

However, in a process of the corresponding failure occurring, a cause that has caused the corresponding failure may be an operation error of the failure-occurred module Gc, but there is a possibility that the failure occurred due to an operation error in a previous module through which the failure-occurred medium has passed. For example, the failure may have occurred at the gate Gc due to an operation error of the gate Ga because media are returned with a return interval between the media narrowed.

In this case, conventionally, a maintenance worker repairs only the gate Gc because the maintenance worker is not provided with any information on the gate Ga that has provided the cause of the occurrence of the failure and is provided with only information on the gate Gc in which the failure actually occurred. As a result, the maintenance worker would only repair gate Gc, and even after the repair, an operation error in gate Ga, which was not repaired, could recur. Therefore, the likelihood of similar types of failures repeatedly occurring is very high.

In order to supplement the problem, in the present disclosure, the aforementioned deposit collection process is constructed to check a node at which the first abnormal sensor value was sensed by checking the sensor values of the sensors Sa to Sg present on the return route in a section from the temporary payment unit in which the medium is kept to the gate Gc in which the failure occurred along the return flow of the medium according to corresponding financial transactions.

That is, the values of all of the sensors provided on the return route along which the medium is returned are checked upon each financial transaction. In this case, each sensor may measure any one or more of the length, width, and thickness of the medium that is returned along the return route, a skew, or a return interval between the media.

Furthermore, in order to determine whether the sensor value corresponds to an abnormal sensor value, a normal range and an abnormal range having a concern of an operation error occurring, that is, not a failure, are previously set for each type of each sensor value. An abnormal sensor value that falls outside the normal range and corresponds to the abnormal range is detected.

That is, in the aforementioned embodiment, when an abnormal sensor value occurs at the sensor Sb for the first time, there is a good possibility that an operation error might have occurred in a module prior to the sensor Sb. Accordingly, sensor information on a node at which an abnormal sensor value was first detected is also included in the failure information. The failure information is provided to the maintenance worker.

FIG. 3A is a diagram that exemplifies failure information that is provided through the display for a worker of the banking ATM in a failure recovery process according to an embodiment of the present disclosure. FIG. 3B is a diagram that exemplifies repair information that is provided from the maintenance server to the portable terminal of a maintenance worker in a failure recovery process according to an embodiment of the present disclosure.

When it is checked that an abnormal sensor value was first sensed in the sensor Sb as the results of the check of the sensor values as described above, as illustrated in FIG. 3A, the banking ATM to which an embodiment of the present disclosure is applied provides failure information to a maintenance worker by including sensor information of the sensor Sb by which the first abnormal sensor value was sensed in the failure information along with information on a failure-occurred module.

Furthermore, in this case, the failure information that is provided to the maintenance worker by the banking ATM may be transferred through a display screen for a worker, or a QR code or barcode, etc., which includes related failure information, may be provided to the maintenance worker by outputting the QR code or barcode to a screen. As in FIG. 3A, the corresponding failure information may also be provided together with the QR code.

Thereafter, the maintenance worker that has arrived at a site for the repair of a corresponding apparatus inputs the failure information that is provided on the display for a worker, of the apparatus, to a dedicated application for a failure repair, which is mounted on his or her portable terminal, or transmits the failure information to the maintenance server by inputting information of the QR code or barcode through his or her portable terminal connected to the maintenance server. The maintenance server predicts a failure cause-providing module by analyzing the received failure information, and provides the portable terminal of the maintenance worker with repair information including a recovery process for solving the failure cause-providing module as in FIG. 3B.

That is, the maintenance server predicts the failure cause-providing module based on the received failure code and first abnormal sensor information, and provides the repair information for recovering the failure cause-providing module to the portable terminal of the maintenance worker.

Through the series of information provision processes performed as described above, the maintenance worker repairs both the failure-occurred module and the failure cause-providing module based on the received repair information. This is described more specifically with reference to FIGS. 4 and 5 described later.

Figure 5:
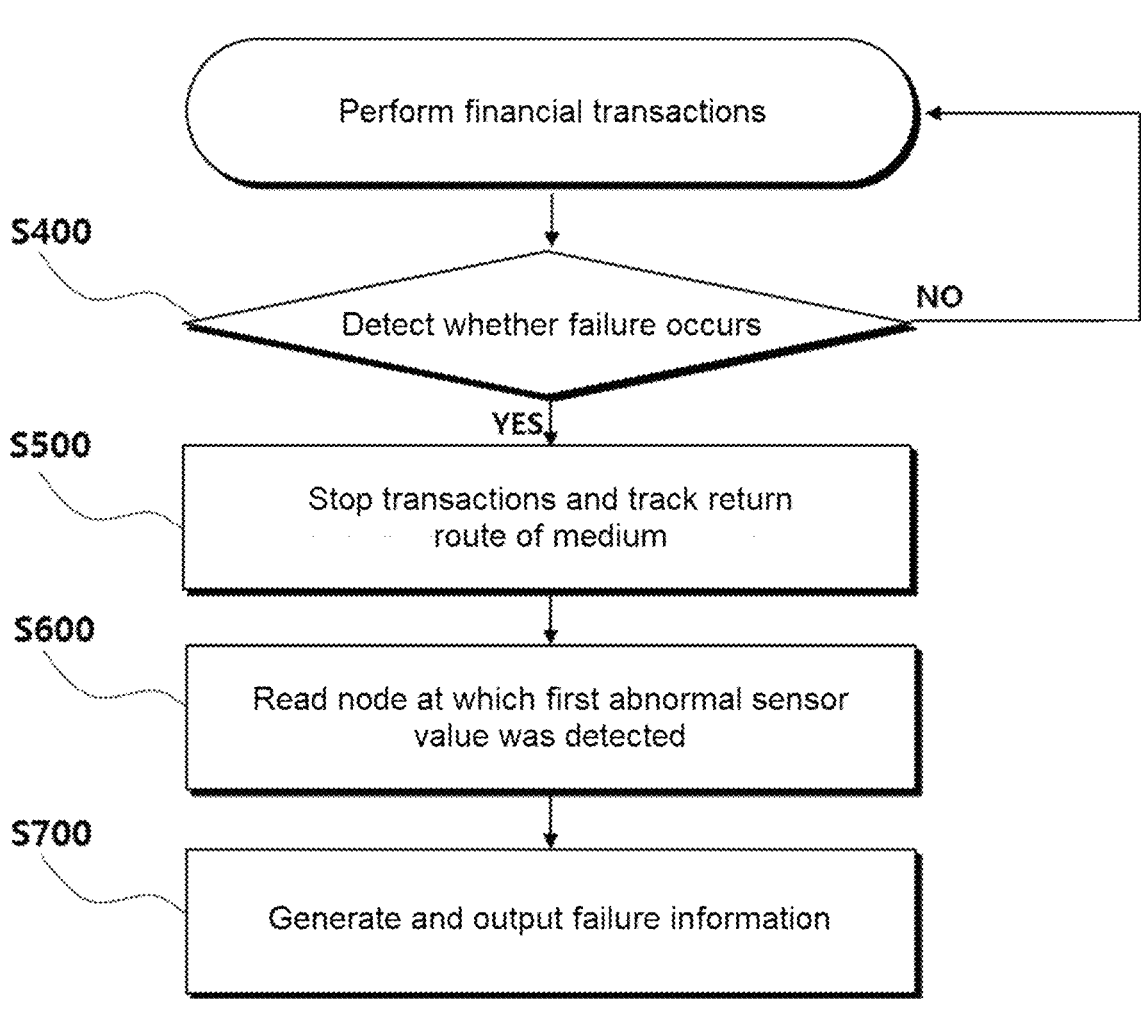
FIG. 5 is a flowchart for describing a failure diagnosis process of the banking ATM according to an embodiment of the present disclosure.

FIG. 4 is a diagram schematically illustrating a networking environment for a system for diagnosing a failure and providing repair information in the banking ATM according to an embodiment of the present disclosure. FIG. 5 is a flowchart for describing a failure diagnosis process of the banking ATM according to an embodiment of the present disclosure.

As illustrated in FIG. 4, the system for diagnosing a failure and providing repair information in a banking ATM according to an embodiment of the present disclosure is constructed to support a failure recovery process of a maintenance worker by transmitting repair information, which is properly matched with failure diagnosis results, to a portable terminal 300 of the maintenance worker who has dispatched to a site through a series of processes by which failure diagnosis results and repair information are derived through networking between the banking ATM 100 in which a failure occurred and a maintenance server 200.

This is described more specifically. When a failure occurs in the banking ATM 100, the banking ATM stops corresponding financial transactions, outputs failure information through the display unit of the apparatus, and also notifies the maintenance server 200 of an apparatus management organization of the failure occurrence fact. In response to the notification of the failure occurrence fact by the banking ATM, the maintenance server 200 of the apparatus management organization dispatches a maintenance worker to an installation point of the banking ATM in which the failure occurred. The maintenance worker who has arrived at the corresponding site notifies the maintenance server 200 of the site arrival fact through his or her portable terminal 300 and also transmits failure information that is displayed on the display for a worker, of the banking ATM.

To this end, a dedicated application for a failure repair is mounted on the portable terminal of the maintenance worker. The portable terminal is constructed to input the failure information or to enable the failure information output in a form, such as a QR code or barcode, to be conveniently recognized and transmitted to the maintenance server.

The maintenance server 200 predict a failure cause-providing module that has caused the corresponding failure and provided the cause of an abnormal operation in association with a node at which the first abnormal sensor value was detected by analyzing the received failure information, selects failure repair information based on information on a failure-occurred module and information on the failure cause-providing module, which are identified based on the received failure code and the first abnormal sensor information, and transmits the failure repair information to the portable terminal of the maintenance worker.

To this end, an algorithm that predicts a failure cause-providing module based on abnormal sensor information along with various failure types which may occur in a banking ATM is mounted on the maintenance server. The maintenance server is constructed to be periodically updated with data by various failure types and sensor information related thereto, which are accumulated in the server.

Meanwhile, the maintenance worker may repair both the failure-occurred module and the failure cause-providing module based on the failure repair information transmitted by the maintenance server. The recurrence of a failure that is caused for the same reason in the same apparatus can be effectively prevented through the system for diagnosing a failure and providing repair information in a banking ATM, which is constructed as described above.

Furthermore, when notifying the maintenance server of the failure occurrence fact, the banking ATM may transmit both the failure code and information of a sensor in which the first abnormal sensor value was sensed.

Meanwhile, in the banking ATM in which the failure occurred, a series of steps for providing the failure information including both the failure code and the first abnormal sensor information as described above is performed. A process of checking the failure information, which is performed in the banking ATM, is described as follows with reference to FIG. 5.

While financial transactions are performed in the banking ATM 100 in response to a request from a customer, when the occurrence of a failure of the apparatus is sensed (S400), the CPU of the banking ATM supports a maintenance worker in the site to repair a failure cause-providing module of the apparatus based on failure information provided on a display screen for a worker, of the banking ATM, by stopping the corresponding financial transactions and checking sensor information of each sensor, which is stored in memory, by tracking the return route of a medium from a failure-occurred module in which the failure occurred in the corresponding transaction process (S500), reading a node at which an abnormal sensor value was first measured in a process of the corresponding financial transactions being performed, among the pieces of sensor information, (S600), and generating failure information including sensor information of the node at which the abnormal sensor value was first measured along with a failure code matched with the failure-occurred module and outputting the failure information through the display unit of the banking ATM (S700).

To this end, an abnormal range for determining whether each of sensor values measured by various sensors included in the banking ATM corresponds to an abnormal sensor value is previously set in the CPU of the banking ATM according to the present disclosure. In this case, the abnormal range of the sensor value falls outside a normal range that is previously set for each type of each sensor value by a predetermined range, but is configured as an abnormal range that does not reach a failure range and has a concern of an operation error occurring, which is previously defined and set.

In this case, the sensor information stored in the memory for each transaction includes sensor values of elements, such as the length, width, and thickness of the medium, a skew, and a return interval between the media, and sensor information, such as the location of the sensor.

Meanwhile, when the occurrence of a failure of the apparatus is not sensed (S400), the banking ATM 100 continuously perform the financial transactions.

It may be evident to a person having ordinary knowledge in the art to which the present disclosure pertains that the present disclosure described above is not limited by the aforementioned embodiments and the accompanying drawings and may be substituted, modified, and changed in various ways without departing from the technical spirit of the present disclosure.

The method of diagnosing a failure and providing repair information in a banking ATM according to the present disclosure can prevent the occurrence of a failure having a similar type by supporting a maintenance worker to be capable of repairing a failure cause-providing module that has caused the cause of a failure along with the repair of a failure-occurred module in a failure recovery process and can improve management and repair efficiency of the banking ATM by reducing frequency of dispatches by a maintenance worker because a node at which an abnormal sensor value was first measured is checked, a failure cause-providing module that has provided the cause of an abnormal operation that has caused a failure is predicted based on the check, and information on a failure-occurred module in which the failure actually occurred and information on the failure cause-providing module are provided to a maintenance worker in the site in a process of performing transactions in which the failure occurred based on sensor values measured by various sensors included in the banking ATM.

DESCRIPTION OF REFERENCE NUMERALS

100: banking ATM
110: deposit and withdrawal unit
120: discrimination unit
130: reject box
140: temporary payment unit
150: banknote cassette
160: return route
200: maintenance server
300: portable terminal

What is claimed is:

1. A banking automated teller machine (ATM) configured to:
   generate a failure code by identifying a failure-occurred module in which a failure occurs when the failure occurs during management of the banking ATM,
   check sensor values measured by multiple detection sensors provided at respective nodes on a return route of a failure-occurred medium in a financial transaction process in which a corresponding failure occurred,
   generate failure information comprising sensor information of a node at which an abnormal sensor value that falls outside a preset normal range was first sensed, among the checked sensor values, along with the generated failure code when the abnormal sensor value is detected, and
   transmit the generated failure information to a management organization of the banking ATM or provide the generated failure information to a maintenance worker who visits a site for a recovery of the failure.

2. The banking ATM of claim 1, wherein the banking ATM provides the failure information to the maintenance worker through a display screen for a worker, which is included in the banking ATM.

3. The banking ATM of claim 2, wherein the banking ATM provides the failure information by converting the failure information into a Quick Response (QR) code or barcode.

4. A method of providing failure diagnosis results and repair information to a maintenance worker in a site when a failure of a banking automated teller machine (ATM) occurs, the method comprising:
   generating a failure code by identifying a failure-occurred module in which a failure occurred in a banking ATM;
   checking sensor values measured by multiple detection sensors provided at respective nodes on a return route of a failure-occurred medium in a financial transaction process in which a corresponding failure occurred;
   reading sensor information of a node at which an abnormal sensor value that falls outside a preset normal range was first sensed, among the checked sensor values, when the abnormal sensor value is detected;
   generating failure information comprising the failure code and the sensor information of the node at which the abnormal sensor value was first sensed; and
   providing the generated failure information to a maintenance worker.

5. The method of claim 4, wherein:
   a range of a normal sensor value for the sensor values measured by the multiple detection sensors is preset and stored in a central processing unit (CPU) of the banking ATM, and
   a sensor value that falls outside the range of the normal sensor value, among sensor values checked in a financial transaction process in which a failure occurred when the failure occurred, is determined to be an abnormal sensor value when the sensor value is detected.

6. The method of claim 4, wherein the failure information is provided through a display for a worker, which is included in the banking ATM.

7. The method of claim 6, wherein the failure information is provided by being converted in a form of a Quick Response (QR) code or barcode.

8. A banking automated teller machine (ATM) repair and maintenance system comprising:
   multiple banking ATMs, each comprising the banking ATM of claim 1; and
   a management server connected to the banking ATMs over a wired/wireless communication network,
   wherein the management server supports a failure cause-providing module that provided a cause of occurrence of a failure to be repaired and maintained along with a failure-occurred module in which the failure occurred in a repair and maintenance process of the banking ATM, by receiving failure information of the banking ATM through a dedicated application mounted on a portable terminal of a maintenance worker, predicting the failure cause-providing module based on sensor information of a node at which an abnormal sensor value was first sensed, which is included in the received failure information, and transmitting repair information comprising information on the failure-occurred module, which is identified based on a failure code and information on the predicted failure cause-providing module to the portable terminal of the maintenance worker.

9. The banking ATM repair and maintenance system of claim 8, wherein an algorithm that predicts a module that has provided the cause of the failure based on a failure type and the sensor information of the node at which the abnormal sensor value was first sensed is mounted on the management server.

10. The banking ATM repair and maintenance system of claim 9, wherein the algorithm that is mounted on the management server and that predicts the failure cause-providing module based on the sensor information is periodically updated with data for each failure occurrence type and sensor information related thereto, which are accumulated in the management server.

11. The banking ATM repair and maintenance system of claim 8, wherein the repair information comprises a detailed repair process comprising locations of the failure-occurred module and the failure cause-providing module.

* * * * *